United States Patent [19]
Winiger

[11] Patent Number: 5,845,068
[45] Date of Patent: Dec. 1, 1998

[54] MULTILEVEL SECURITY PORT METHODS, APPARATUSES, AND COMPUTER PROGRAM PRODUCTS

[75] Inventor: Gary W. Winiger, Mountain View, Calif.

[73] Assignee: Sun Microsystems, Inc., Mountain View, Calif.

[21] Appl. No.: 769,603

[22] Filed: Dec. 18, 1996

[51] Int. Cl.$^6$ .................................................. G06F 11/00
[52] U.S. Cl. .................... 395/186; 397/186; 397/187.01; 397/188.01; 397/200.57
[58] Field of Search .............................. 395/186, 187.01, 395/188.01, 200.59, 200.56, 200.57

[56] References Cited

U.S. PATENT DOCUMENTS

| | | | |
|---|---|---|---|
| 5,075,884 | 12/1991 | Sherman et al. | 395/186 |
| 5,481,672 | 1/1996 | Okuno et al. | 395/188.01 |
| 5,572,673 | 11/1996 | Shurst | 395/186 |
| 5,577,209 | 11/1996 | Boyle et al. | 395/187.01 |
| 5,692,124 | 11/1997 | Holden et al. | 395/187.01 |

*Primary Examiner*—Robert W. Beausoliel, Jr.
*Assistant Examiner*—Pierre Eddy Elisca
*Attorney, Agent, or Firm*—Robert P. Sabath; Edward B. Weller

[57] ABSTRACT

A multilevel port system on a computer operating under a multilevel operating system to permit contemporaneously opening a plurality of sockets having the same port number while meeting the requirements of an appropriate security policy, thus allowing third party applications to run as if they were unimpeded by the security policy, and methods thereby. The computer system having an operating system adhering to an access control security mechanism. Such systems include government systems wherein a hierarchy of security classification levels are defined (e.g., top secret, secret, classified, unclassified), and commercial systems. Sensitivity labels pursuant to an access control security mechanism include at least hierarchical security classifications, and may include non-hierarchical categories or compartments which represent distinct areas of information in a system. A port is characterized by a port number and a sensitivity label thus permitting opening a plurality of ports having identical port numbers and unique sensitivity labels.

10 Claims, 6 Drawing Sheets

MULTILEVEL SECURITY PORT METHODS, APPARATUSES, AND COMPUTER PROGRAM PRODUCTS

TECHNICAL FIELD

The present invention relates to multilevel port methods, apparatuses, and computer program products operable in computer systems, and more particularly, to multilevel port systems operable in multilevel operating systems utilizing multilevel multiple security levels.

BACKGROUND

Secure computer systems restrict information from unauthorized disclosure. Government secrecy systems ensure that users access only permitted information in accordance with predetermined security clearances. Other secure environments protect selected private information including payroll data and other sensitive company data including internal memoranda and competitive strategy documents.

To establish computer security for government or company systems, a security policy is adopted. The security policy establishes rules for managing, protecting and distributing sensitive information. A security policy is typically stated in terms of subject and objects. Subjects are active within a selected system and include users, processes, and programs, for example. Objects are the recipients of subject action, such as files, directories, devices, sockets, and windows. A security policy may set rules to determine whether a subject user has access to a particular object such as a file.

One well-known security system developed by David Bell and Leonard LaPadula in 1973 describes a multilevel secure computer system having access rules depending upon the security clearances of messaging processes. Security systems based upon access rules rely upon reference monitors which enforce authorized access relationships between subjects and objects of a system. A security kernel concept developed by Roger Shell in 1972 implements the reference monitor notion that all system activity is supervised in accordance with the system's security policy. The kernel accordingly mediates. A "trusted system" has sufficient hardware and software integrity to allow its use to simultaneously process a range of sensitive unclassified or classified information for a diverse set of users without violating access privileges.

Networks require that the security mechanism of a trusted system be able to control communication with the trusted systems. Previously, a network administrator typically had tight control over system connections with other systems. However, with the proliferation of interconnected networks and easy remote access and resource sharing, systems often cannot identify or trust the entire network.

Strategies for establishing security in network environments require labeling data with predetermined security attributes or sensitivity labels, information labels. This enables recognition of data sensitivity at other systems of a network. Because different networks support different security policies, these labels are not necessarily in the same format. In certain secure networks, each system may have a different kind of label. A user sensitivity label specifies the sensitivity level, or level of trust, associated with that user. A file's sensitivity label similarly specifies the level of trust that a user must have to be able to access the particular file. Mandatory access controls use sensitivity labels to determine who can access what information in a system. Together, labeling and mandatory access control implement a multilevel security policy—a policy for handling multiple information classifications at a number of different security levels within a single computer system.

Under mandatory access control, every subject and object in a system supporting mandatory access controls has a sensitivity label associated with it. A sensitivity label generally includes a classification and a set of categories or compartments. The classification system is typically hierarchical, including in a military security model, for example, multiple distinct levels, such as top secret, secret, confidential and classified. In a company environment, other classifications may be followed including labels such as company confidential, or company private.

Typically, for a subject to read an object, the subject's sensitivity level must dominate the object's sensitivity level. A subject's sensitivity label dominates the object's sensitivity label if the subject's classification is equal to or exceeds the classification of the object. Similarly, in order to write an object, the object's sensitivity level must dominate the subject's sensitivity level. In order for a subject to write to an object, the subject's sensitivity level must be equal to or less than the sensitivity level of the object or file. Consequently, in a current mandatory access system, in order for a subject to freely read and write to and from an object, both the subject and the object must have the same classification label. This is the fundamental rule by which an access control system works, and by which two-way communication may take place between trusted computer systems.

In current networked multilevel trusted systems, third-party applications have only limited support for operating effectively. In particular, when multiple processes having different sensitivity labels attempt to access the same object or resource, despite differences in security level, the operation may block. In the prior art diagram of FIG. 1, an application runs on a trusted system and attempts to access a resource (i.e., a file, an application, or a database) either on the same system or on another system in a network. For success, the security levels of resource and subject must necessarily be the same in order to permit two-way communication according to the applicable access control security mechanism.

Figure 1:
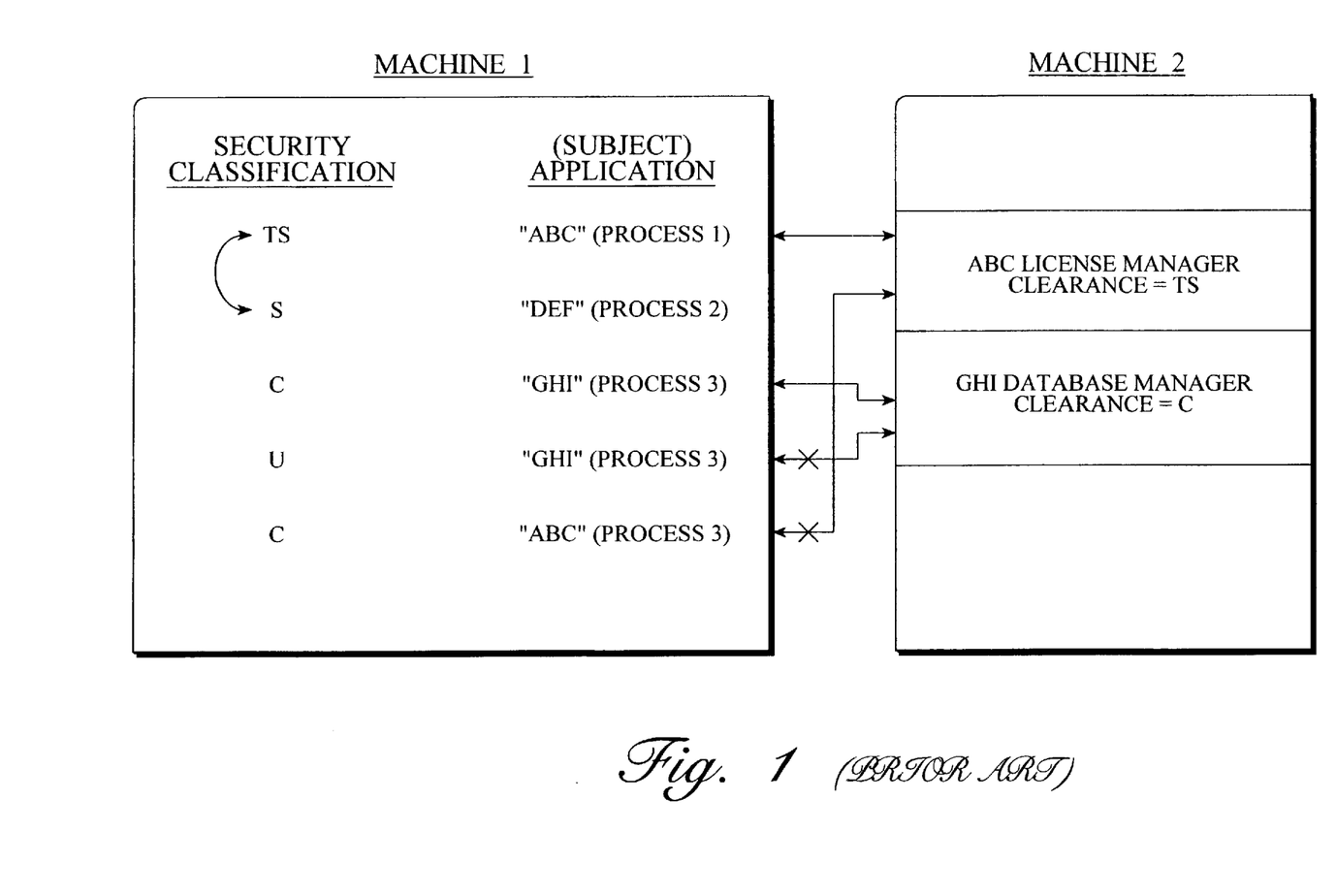
FIG. 1 is a block diagram of a multilevel trusted system having a plurality of ports and endpoints at predetermined security levels, according to the prior art.

In multilevel trusted systems of the prior art as shown diagrammatically in FIG. 1, access to a resource or a service (object) by a process (subject) running at a particular sensitivity level is restricted to objects in memory having the same sensitivity level as the requesting process, as mandated by the access control mechanism. Consequently, two-way communication is precluded where the subject and the object have different sensitivity labels. Once a requested application, service or resource is instantiated in computer memory, a sensitivity label is associated with the process, service, or resource, and access by other processes running applications which also desire to access the resource, but which have a different clearance, is denied.

Another technical problem arises, however, in the prior art system of FIG. 2 described below when a port on a receiving system remains open for a substantial period of time at a particular security classification, clearance level, or sensitivity label. This prevents users and systems having different clearances from accessing the same resource, when a port has already been opened and remains open under a different clearance. Since a port number is unique to a resource or third party system being accessed, the unavailability of that particular port effectively precludes other users or systems with different clearances from accessing the third party resource. This effectively renders the resource unavailable to applications operating at different security levels.

Accordingly, there is a need for systems and methods providing access to resources operating at multiple security levels. Such systems and methods must be transparent to processes having different security classification levels.

An additional problem with current multilevel trusted systems is security violations from interlevel signal channel communications between associated system ports or covert channels. A covert channel is an information path that is not ordinarily used for communication in a system and thus is not protected by the system's normal security mechanisms. Thus, there is a secret way to communicate information to another person or program in violation of security protocol. The covert channels convey information by changes in data attributes or by changes in system performance or timing. By monitoring attribute changes for stored data and system timing, confidential information may be inferred. Data characteristics such as message length, frequency, and destination may be protected from analysis of data traffic by an intruder or from a user having a lower classification on the same system, with techniques such as covert channel analysis, padding messages to disguise their actual characteristics, or by sending noise or spurious messages. However, such measures do not guarantee data security.

Accordingly, there is a need for systems and methods to prevent data access in violation of security protocol to ports having a dominant classification in a multi-security level computer system. Such systems and methods must secure access to the dominant port to protect attribute information from compromise to an intruder.

SUMMARY OF THE INVENTION

According to the present invention, multilevel trusted systems associate multiple port endpoints with a single identifier code indication or name. Use of a single identification to associate multiple port endpoints enables provision of a security check which halts inter-endpoint communication when the endpoints are further associated with a common identifier code indication. This is beneficial because security breaches caused by interlevel communication are diminished.

According to the present invention, use privileges for third-party communication at a selected network level are affirmatively granted at multiple specified levels. This is beneficial as it permits direct and unmodified application operation at desired multiple levels, permitting multilevel trusted system operation without applications software modification.

According to the present invention, a computer system comprises a machine-readable program storage device embodying a program of instructions executable by the machine to perform method steps in a multilevel trusted system for establishing a multilevel port to enable multiple, substantially concurrent resource accessing.

According to the present invention, a computer system comprises an operating system kernel supporting a multilevel access control security mechanism for creating an object access packet comprising an internet protocol (IP) header including a destination socket having a machine address and a unique port identifier, a port identifier comprising a port number specifying a resource or object, and a sensitivity label for an access control security protocol. According to the present invention, a plurality of processes are created on a destination system for a single selected port number at a selected unique sensitivity label, permitting resource and object access by multiple users in a multilevel access control system to a selected port according to a selected security policy.

According to the method of this invention, machine readable code opens multiple instances of a selected application, both instances having the same port address and a separate sensitivity label.

According to the present invention, multiple network endpoints having the same port number but separate security classification labels are established, permitting contemporaneous process port access according to a common port number while still adhering to the system security policy. As many ports may be open with the same port number as there are different security classifications used by the system access control security protocol.

BRIEF DESCRIPTION OF THE DRAWINGS

FIG. 6 is a diagram of a multilevel trusted system processing a communications packet according to the present invention.

DETAILED DESCRIPTION OF A BEST MODE OF THE INVENTION

Figure 2:
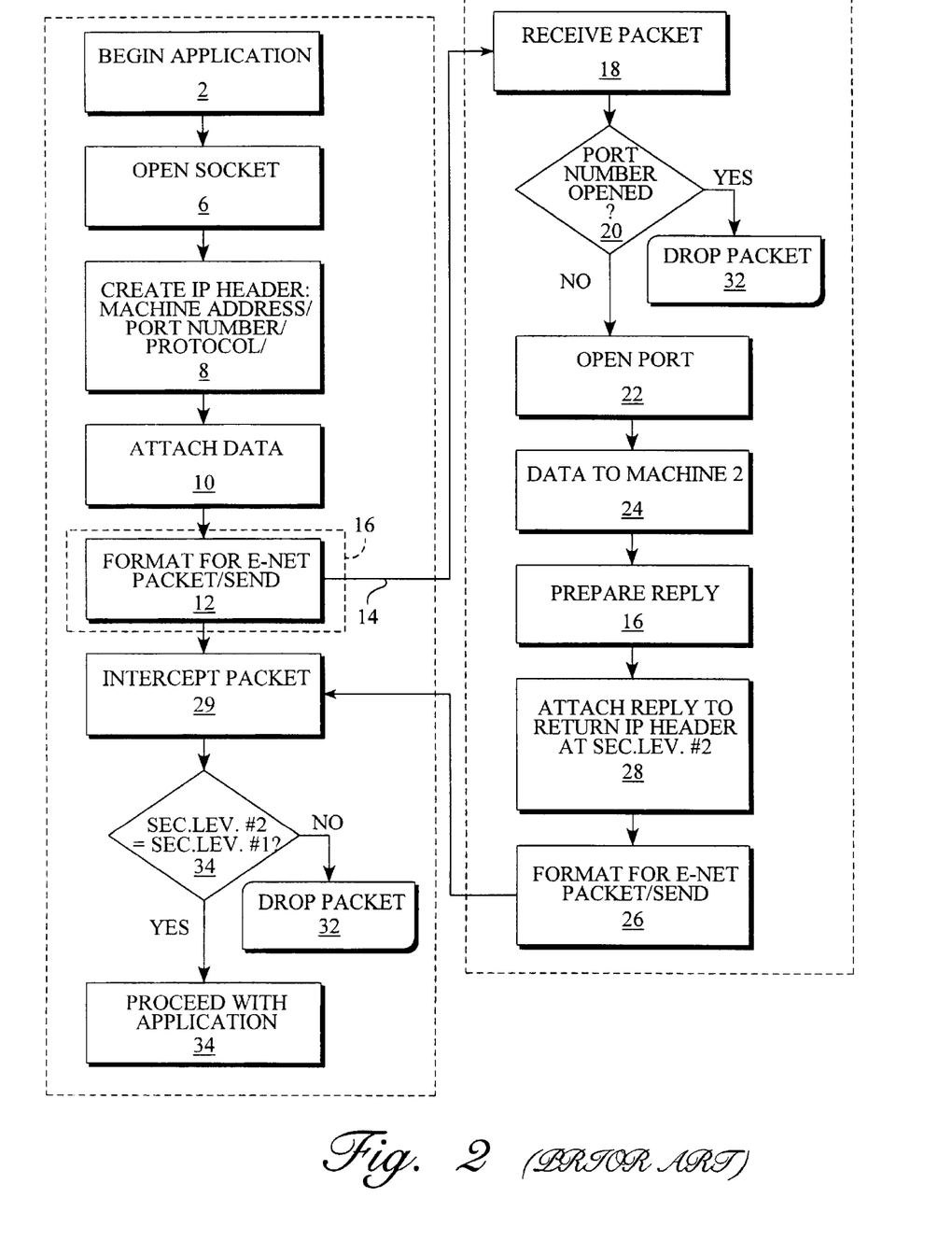
FIG. 2 is a flow diagram of a multilevel trusted system according to the prior art, in which a datagram or message packet is communicated between a source system and a destination system.

FIG. 2 is a flow diagram of a prior art system employing access control security mechanisms. Third party applications require a license verification from a remote third party computer system. Alternatively, license verification may be an object in a process operating on the same system as the process in which the application is running. Once an application is instantiated on a first operating system, it may determine that communication with an object process is required. The kernel on the first system accordingly creates 6 a socket, and constructs 8 a communications packet, including an appropriate header, a machine address, a port number, and a protocol identifier, attaches 10 a data and a sensitivity label continuing the clearance of the process under which the application is running, and transmits 12 through socket a data packet over a selected electronic communications medium.

An internet protocol (IP) header typically contains source system information for the system originating communication and information regarding the destination system. This information includes machine numbers of the source and the destination computers, the port numbers or addresses identifying applicable applications and services provided, and the protocol (e.g., TCP/IP, or UDP/IP) by which the two computers will communicate. Port numbers or addresses identify application or subject running on a client computer, and the application object or resource to be accessed on a destination machine such as a license verification program on a remote machine 13 or server.

During network communication, an IP header and data are electronically communicated 14 from the source system, through a socket endpoint for receipt 8 by a destination server. The destination kernel determines whether a requested port is available 20. If the port is available (i.e., not yet opened), the requested port opens 22 at a clearance level associated with the sensitivity label of the incoming communication. If the requested port number is in use, the request is dropped 32, possibly with a negative acknowledgment (NACK) being returned to the source server. The same classification level is required for two-way communication between a source system and a destination system under an access control security mechanism.

If a request is processed, the destination system opens 22 a port and prepares 16 a reply 16 and an IP header for the reply. An IP sensitivity label for the process under which the object application is running is additionally attached 28 to the reply. Under mandatory access control, the sensitivity label must contain the same security classification of the request of the originating system. The reply packet is further sent 26 to the originating server, where the packet is trapped 29 by the source kernel and inspected 30 pursuant to the security protocol for that system. If the reply packet is not provided at the same security level as the original request, the packet is dropped 32. Otherwise, the packet is passed-on 34 to the requesting application.

Figure 3:
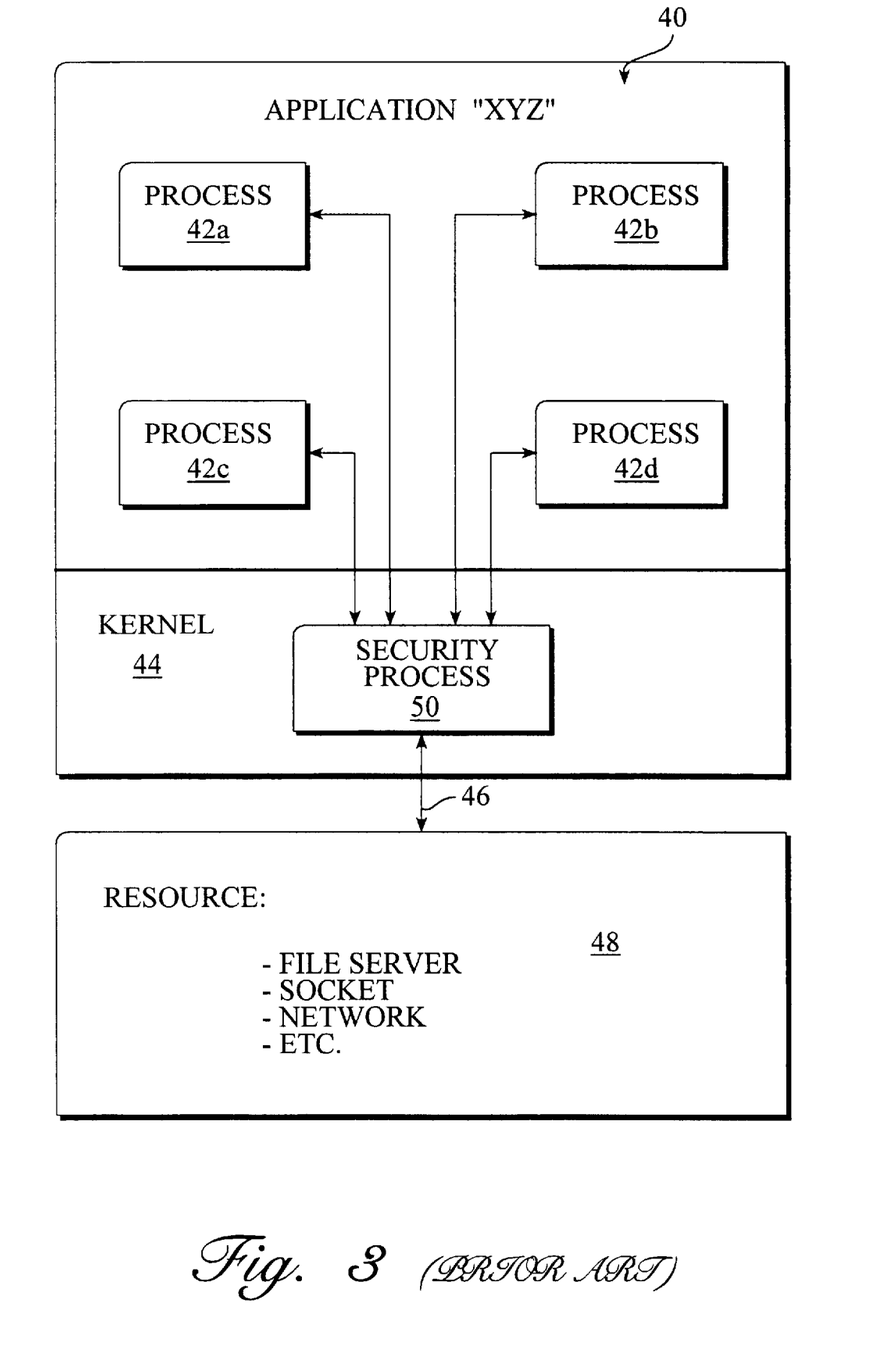
FIG. 3 is a block diagram of a security system according to the prior art.

FIG. 3 shows a multilevel trusted system according to the prior art, including first through fourth instances of the same selected application 40 running concurrently. The application instances of a running application are respective processes 42a–42d. Each of processes 42a–42d is assigned a particular security classification, and each process handles communication between application 40 and kernel 44. The assigned security classification, may be a predetermined clearance level based upon the identity of a user or a user category, or a type of application, for example. Kernel 44 controls input output functions, memory, processes, and operational aspects of running application 40. Kernel 44 mediates relationships 46 between processes of application 40 and selected resources 48, such as objects, services, and external application connecting to the processes of application 40. Kernel 44 includes a security process 50 ensuring that each process of application 40 communicates only with resources having a security classification consistent with a predetermined security policy. According to a mandatory access control (MAC) system, for example, security process 50 ensures that processes 42a–42d only communicate with resources 48 at the same security classification as the corresponding process of application 40. All MAC objects are accordingly labeled with a security label which is used for communications packets traveling between the application process and the resource with which it has message traffic.

Figure 4:
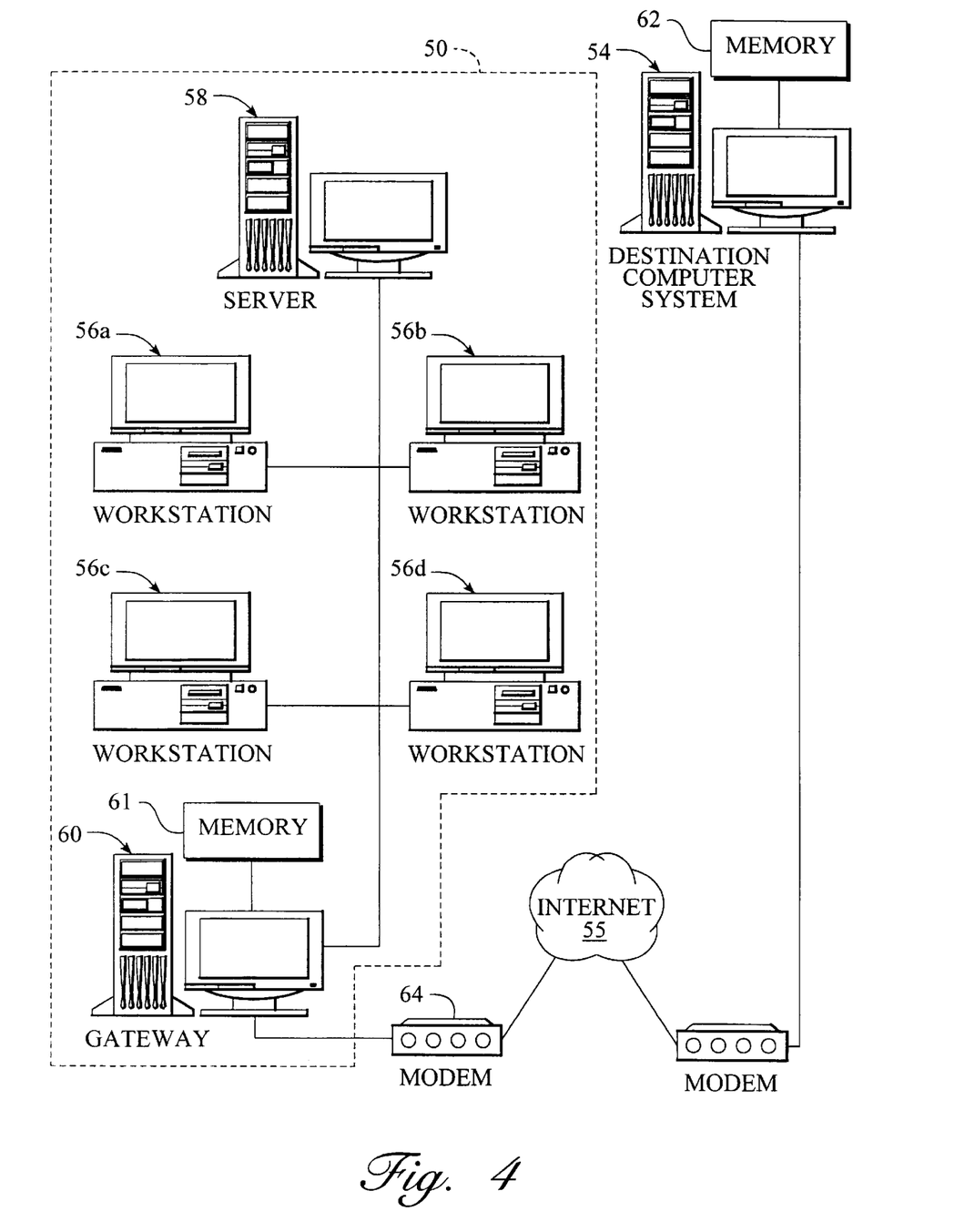
FIG. 4 is a diagram of an internet system according to the present invention.

FIG. 4 shows a multiuser, multilevel source trusted computer system 50 according to the present invention, which is networked to a second computer system 54 through a communication network 55, such as the Internet. In a typical configuration, several users are networked into a server. Source trusted computer system 50 includes a network including a plurality of user workstations 56a–56, a server 58, and a gateway server 60, which may be employed as a firewall to prevent unauthorized access to source trusted computer system 50. The gateway server 60 includes a memory 61 for storing a kernel (not shown). The second computer system 54 includes a memory 62 for storing a kernel. For incoming messages, a security inspection is performed on incoming packets by the kernel (not shown) of gateway server 60. A received packet is passed into source trusted computer system 50 only after it has been determined that the packet has satisfied the security protocols of the source trusted computer system 50. In a multilevel trusted system using a mandatory access control security protocol, for example, the kernel of source trusted computer system 50 ensures that the sensitivity label of an incoming communications packet is the same as or higher than the sensitivity label of the destination process or port destination of computer system 54 to which the packet is addressed. If the packet security classification is not the same as or higher than the security classification destination port, then the packet is discarded from further processing. Message packets are sent through a modem 64 or a network interface card (not shown) over a selected transmission medium 62 formed of a copper wire, a fiber optic link, a microwave line, or a radio broadcast transmission link. The selected link with destination computer system 54 may be directly through a LAN connection, a direct phone link, or indirectly such as through the Internet. Upon reaching the destination computer system server, the message packet is intercepted by the server kernel (not shown). Should the destination server employ an OSI interface, the message packet is preferably analyzed at the lowest software level of the OSI stack, ensuring that the kernel examines the subelements of each message packet.

In one embodiment, each workstation 86 couples through a modem 64 to the Internet 55, and includes a kernel that performs security.

Figure 5:
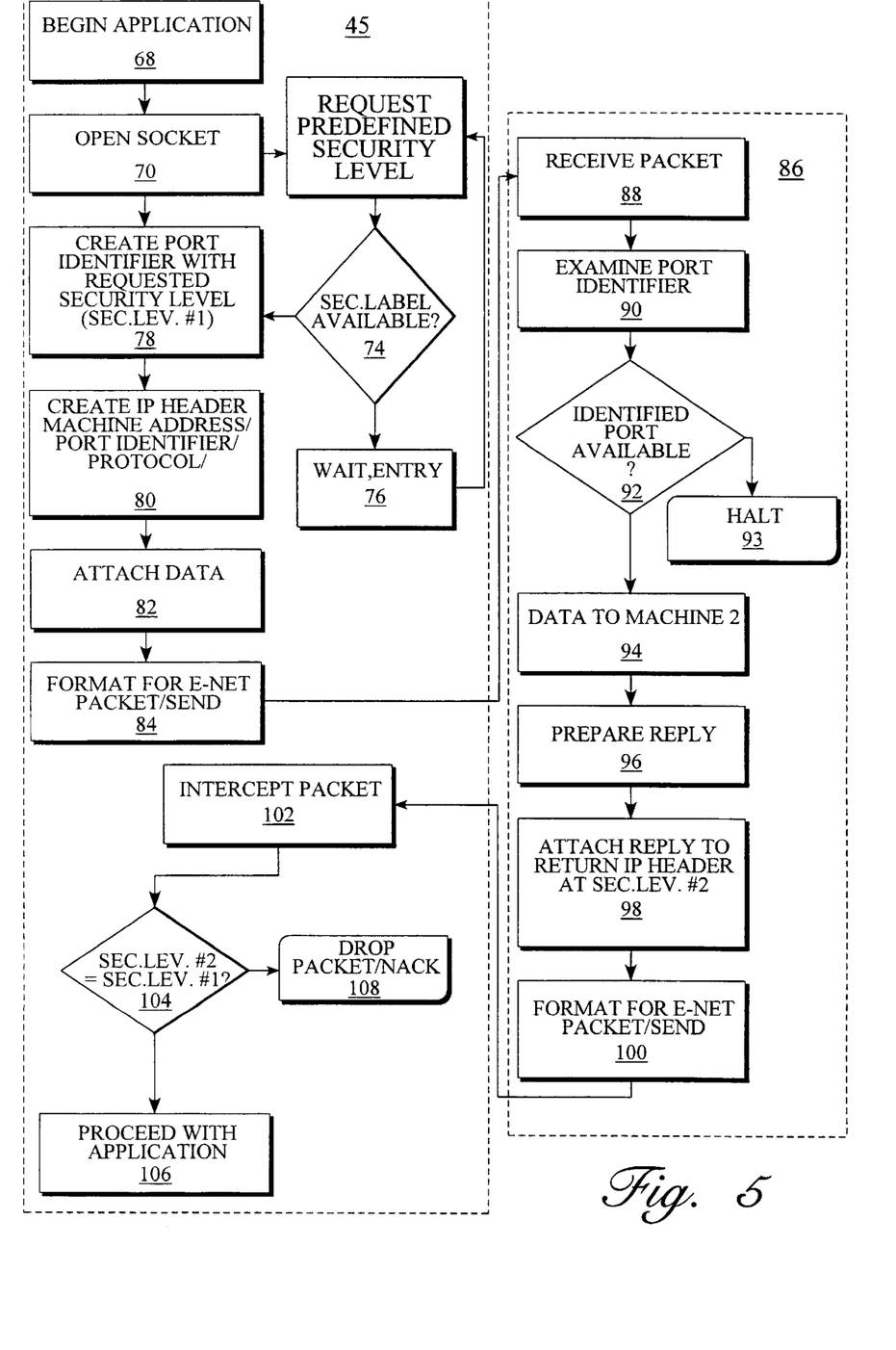
FIG. 5 is a flow diagram of multilevel trusted system operation according to the present invention.

FIG. 5 is a flow diagram of a method for establishing multilevel ports according to the present invention in which a requesting application runs on a first data processing node 45 (i.e., Machine One). A second data processing node 86 (i.e., Machine Two) includes a plurality of ports associated with predetermined security classifications. According to the present invention, Machine One runs 68 a selected application, which establishes its own security level consistent with the security clearance of the user. When the application being run calls a resource or object at another data processing node, the local machine kernel opens 70 a socket to the other resource or object for which a message carrying a service request can be made. The socket identifies the destination machine, a port number corresponding to the application program being run, and the local process security level. A port identifier is created by first requesting 72 an applicable security level for the associated port number opened by the kernel. The kernel further checks to see if the requested port is available 74 at that security level. If that port number and security level combination is currently in use (e.g., by another user) the kernel waits 76 for a predetermined time before again polling to determine if the particular security level is available for the port number. On the other hand, if the particular port number and security classification combination is available, the kernel combines the security level and port number to create 78 a port identifier. Then, the applicable IP header for a message packet is created 80 by inserting the port number and security label combination into the protocol spaces of the IP header normally reserved for just the port number. The message packet is completed by attaching 82 application specific data and information into predetermined regions of IP header to create a complete datagram. The completed datagram packet is then formatted 84 for electronic communication and sent to the destination server 86.

The operating system kernel 86 of data processing node 86 intercepts 88 the packet from Machine One and examines 90 the subelements of the packet to extract the port identifier. Once the port number and security label have been extracted, the kernel determines whether the requested port at the specified security level is in open status, and if so, whether it is presently available 92 for access. If the port is unavailable in that the combined port number and sensitivity label is in use by another application, then the operation terminates 93. If the port is available, applicable data from the message packet is transferred 94 to the applications portion of the applicable operating system stack of data processing node 86 for application processing. After data is provided to the application, an applicable reply is prepared 96 as appropriate, and an applicable IP header is attached 98 to the reply message which is prepared. The reply message is formatted 100 for packet transmission over an electronic network, and sent to first data processing node 45.

The kernel of first data processing node 45 intercepts 102 the applicable reply packet and examines the packet to verify 104 that the reply message has been provided at the same security level as the applicable application process is running in data processing node 44. If the security levels of the local process and the remote message received are the same, the reply is passed 106 to the application for processing. If the reply is at a security level inconsistent with the security level of an applicable local application, the reply packet is terminated and, if applicable, a negative acknowledgment is sent 108 to the second data processing node 86. Although the reply packet examination shown in FIG. 5 indicates that the security level of the reply packet is the same or equivalent to the security level of the application process, according to the present invention, the reply packet may have a lower security level if the reply packet is to be read by the application. Any access controls may be used for receipt of message packets so long as the control is consistent with the system's security policy.

FIG. 6 shows a method according the present invention to determine whether a requested port is available for communication between data processing nodes. In particular, an incoming packet 86i is shown intercepted 110 by a destination system's operating system. Security examination is performed at the data link and network levels of the kernel interface operating system interface 66. The IP header element 112 of packet 86i' is examined and the port number and the security label subelement 114 are identified. The kernel checks to determine if the requested port number is already open 116. If not, the requested port is opened 118 at the security level indicated by the security label. Activities for opening a port at a particular security level are logged 122 to provide a journal or history of the activity and to provide a database of security levels which are presently open for particular port numbers. A decision is made 120 whether to pass the packet to a local application. If all other protocol requirements have been satisfied, the data is passed to the applications process 86" for handling and completion. If all other protocol requirements have not been satisfied, the packet is dropped 108.

If a registered port number requested is already open 116, the operating system kernel determines 124 whether each opened port is at the security level specified by the port identifier's security label. If not, then a new port having the same number as the existing port is opened 118 at the identified security level. The opening of the port is logged 122 to journal the activity, as described above. If the existing open port is at the same security level as identified in the port identifier subelement, then it is determined 126 whether the port is in use. If the port is presently in use, then a mandatory access control protocol precludes opening another port at the same number and security level being opened. Consequently, a packet is either buffered 128 and checked periodically until a pre-defined time-out 130 occurs, causing packet process termination or the packet is terminated 108 immediately, or until the port becomes unused 124, 125. If an open port is set to a correct security level but not currently in use 126, then the port activity is logged and a decision is made 120 whether or not to pass the packet. If all other security criteria is met, the packet is forwarded for application processing.

According to the present invention, a computer system having an operating system adhering to selected access control security mechanism includes government systems wherein a hierarchy of security classification levels are defined (e.g., top secret, secret, classified, unclassified), and commercial systems. For purposes of this application, sensitivity labels pursuant to an access control security mechanism includes at least hierarchical security classifications, as described above, and may include non-hierarchical categories or compartments. For example, these categories may refer to various plant sites according to particular demographics, product types, as well as categories defined by cross-functionalboundaries such as accounting, public relations, marketing, engineering and R&D. Consequently, an entity holding a particular security classification may not automatically be cleared for all information at that level in every category. An application instantiated in the memory of the computer system may require access to a third party resource or object either on the same system or on a different system. The kernel, after determining that the user has permission to demand the resource, generates an IP header in preparation for communicating with the resource. The IP header includes source and destination machine identification numbers, and port identifiers. The port identifier for a destination system comprises a port number specifying a particular resource, database, or service requested by the source application, and a sensitivity label. The sensitivity label includes a security classification or clearance of the process in which the application is running, and may include other information such as category restrictions. The source system kernel attaches any application data to the header to create a datagram or message packet. The source system kernel further opens a communications socket and transmits the resultant packet to a selected destination system.

The destination system kernel receives the packet sent and analyzes the port identifier in the packet header. If the requested port number has not yet been opened on the destination system, the destination system kernel launches the requested application at a process security level consistent with the security level identified by the sensitivity label in the port identifier in the packet header (i.e., a same or lower classification level). The process run may further be qualified by a category designator carrying the security label of the source system packet, establishing multiple ports at the same port number and clearance for different categories. Packet examination and reading occurs according to one embodiment of the present invention at a destination system server, at a gateway server acting as a firewall between a destination server and a third party system, or at any server internetworked with the destination server.

Further according to the present invention, any requested jobs and services are performed. If the clearance of an object process is the same as the source process clearance, the destination system kernel creates a reply packet for transmission to the source computer system. However, if the destination system kernel determines that the port number is open, but that the sensitivity label associated with the source is different from the sensitivity label of the opened port, the destination system kernel will open another port having the same port number at a security classification consistent with the sensitivity label of the source port identifier. Similarly, should another incoming packet have a source port identifier in its IP header request the opening of a third instantiation of the destination port at a third, different security classification, the destination systems kernel launches a third instantiation of the application pursuant to a process having a security classification consistent with the sensitivity label of the third port identifier. It is clear that as many instantiations of an application having the same port number may be opened, or running contemporaneously, as there are classification levels. Moreover, if additional categories are used to create unique port identifiers, then the number of ports having a common port number that might be opened contemporaneously is the sum of the number of categories.

If a destination system kernel determines that a port number is open at a particular classification level or for the same category and is open, the destination system kernel passes the received packet to an open destination process. However, if a destination port has the appropriate classification level or the same category is presently occupied with a previously received request, the destination system kernel does not pass the received packet to an associated destination process. Instead, the receiving kernel may buffer the received packet until a process becomes available at an acceptable security level or the kernel may reject the packet. An appropriate response message may then be sent back to the source system.

By way of example without limitation, an application instantiated in the operating system of a computer may require access to an external resource for license validation or verification. As a result, the receiving system operating system constructs a datagram or message packet comprising an IP header including source and destination socket identifications and communications protocols and may attach a license validation request associated with the application. A socket associated with a source process includes a machine address and a port number identifying a desired resource (e.g., the license validation service). According to the present invention, a new port identifier comprises a port number and a sensitivity label. Upon receipt of a message datagram or packet by a recipient license server, a receiving kernel examines the received message according to receiving system security protocols. The receiving kernel determines whether the port designated by the received message at the particular classification indicated by the sensitivity label in the message header is open. If the port at that classification is not open, or is unoccupied, then the kernel transfers the received message packet to a communications manager and opens a licensing verification application instantiated in a process at the indicated security label. If the port at the designated security classification has already been opened and is occupied (i.e., the required resource is in use by another user at the same security classification), the packet is buffered or dropped and a negative acknowledgment may be communicated back to the source system.

According to the present invention, security daemon resident in the receiving system executes a receiving system security protocol and determines whether to receive arriving message packets and whether to open a port at a requested security level. The security daemon according to one embodiment of the present invention operates between an Open Systems Interconnection (OSI) data link layer and OSI network. By inspecting incoming datagram and packet messages, the security daemon ensures that the kernel intercepts and inspects packets and messages traversing local interfaces. The security daemon according to the present invention accesses individual packet elements and sub-elements of the port identifier.

According to the present invention, multiple system sockets or endpoints having the same port number and a unique sensitivity label are opened to third party applications at network endpoints including multilevel trusted systems.

Although the invention is described herein in terms of preferred embodiments, it is understood that after having read the above description, various alternatives will become apparent to those persons skilled in the art. For example, the security label need not be associated with the port number at the source server. A composite port identifier according to the present invention, which comprises both port number and a security label, can be constructed at any time prior to the opening of a destination port. Accordingly, software modifications at the source data processing need not include combining the security label with the port number. The port number may be associated with the data in a transmittal packet, and combined with the port number incident to examination by the destination server kernel. The present invention accordingly includes the scope of the appended claims stated as broadly as the prior art will permit and specification will permit.

What is claimed is:

1. A computer program product comprising:
   a computer useable medium having a computer readable program code mechanism embodied therein for generating a plurality of ports, said ports being associated with a common port number, each of said ports having a selected sensitivity label, said port number and said sensitivity label defining a selected port identifier for at least one of said ports, permitting multiple, simultaneous access to the port, said computer code mechanism comprising:
   first computer readable code mechanism for constructing a communications packet comprising a protocol header in turn comprising at least source machine identification, source port number, and destination port identifier region, said destination port identifier region including a destination port number and sensitivity label subregion; and
   second computer readable code mechanism for permitting reception communications packets for establishing receiver ports.

2. A first program storage device readable by a machine, tangibly embodying a program of instructions executable by the machine to establish a multilevel port for enabling multiple, simultaneous access of a resource in a multilevel trusted system, said first program storage device comprising:
   first computer readable code devices configured to receive a communications packet from a source machine running an application instantiated in a first process, said packet comprising at least a first destination port number and a first sensitivity label;
   second computer readable code devices configured to examine said packet for identifying said port number and said sensitivity label, said port number and said sensitivity label, together providing a port identifier;
   third computer readable code devices configured to compare said port identifier to port identifiers associated with pre-existing open ports; and
   fourth computer readable code devices configured to open a port having the same port number as pre-existing open ports when said sensitivity label of said port identifier is unique as compared to sensitivity labels of pre-existing open ports, said opening permitting contemporaneous processes associated with a plurality of ports having the same port number, and a unique sensitivity label.

3. A first program storage device as in claim 2 further comprising a kernel having a security portion, said security portion including said third and fourth computer readable code devices.

4. A first program storage device as in claim 3, further comprising:

fifth computer readable code devices configured to pass a data portion of the communications packet to the process instantiating the application associated with the port previously opened in said port opening step;

sixth computer readable code devices configured to prepare a reply communication packet for transmission to said first process, said reply communication packet comprising at least a destination port number, a second sensitivity label, and a reply;

seventh computer readable code devices configured to transmit said reply communication packet to said source machine; and eighth computer readable code devices configured to process said reply communication packet by said source machine in accordance with the security protocol of said source machine.

5. A computer having a multi-level trusted operating system, comprising:

a computer useable medium having a computer readable program code mechanism embodied therein for generating a plurality of ports, said ports being associated by a common port number, each of said ports having a unique sensitivity label, the combination of said port number and said sensitivity label defining a unique port identifier for each of said ports, said plurality of ports permitting multiple, simultaneous access of said common port number, said computer readable code mechanism in said multi level-trusted system.

6. A computer as in claim 5, wherein said computer readable code mechanism also includes computer readable code means for receiving a communications packet, for examining the packet to extract a destination port number and a sensitivity label, for determining the availability of a port having a unique port identifier address, and for opening a port having a unique port identifier address.

7. A multilevel port for permitting simultaneous access by a plurality of processes, each process having a different sensitivity label, the multilevel port defined by a common port number and a plurality of selected, unique sensitivity labels to permit two-way simultaneous communication between said port and ones of the plurality of processes having the same sensitivity labels as ones of said plurality of unique sensitivity labels.

8. A method for enabling simultaneous access of a port by a plurality of processes in a multilevel trusted system, comprising the steps of:

intercepting a first communications packet in a second computer system, said communications packet generated by the kernel of a first computer system, said communications packet comprising a destination port number and a first sensitivity label;

examining the communications packet to extract and identify said port number and said sensitivity label, said port number and said sensitivity label combination defining a port identifier;

comparing said port identifier to the port numbers and sensitivity labels of pre-existing open ports;

establishing a port in the event no pre-existing open port has the same port identifier as defined in said communication packet;

establishing another port when one of the pre-existing ports has the same port identifier and a different sensitivity label as defined in said communication packet, said another port and said one of the pre-existing ports being simultaneously accessible by said plurality of processes; and passing the data portion of said communication package to an applications process in said second computer system, said applications process having a port number and sensitivity label equivalent to said port identifier.

9. A method for enabling simultaneous access of a port as in claim 8 wherein said intercepting step is performed by a daemon operating between the data link and the network layers of a second computer system operating under an OSI protocol.

10. A method for enabling simultaneous access of a port as in claim 8 further comprising:

preparing a reply;

constructing a second, return communications packet, said return communications packet comprising at least a reply, a source port number, and a second sensitivity label associated with said applications process in said second computer system;

transmitting said second communications packet to said first computer system;

intercepting said second communications packet by a kernel in said first computer system;

comparing said first sensitivity label to said second sensitivity label; and processing the reply in accordance with the security protocol associated with the kernel in said first computer system.

* * * * *